Patented Jan. 19, 1932

1,842,186

UNITED STATES PATENT OFFICE

ROBERT K. McBERTY, OF TARENTUM, PENNSYLVANIA

PROCESS OF PRODUCING LIGHT-WEIGHT BUILDING MATERIALS

No Drawing.   Application filed May 3, 1929.   Serial No. 360,313.

This invention relates to ceramic articles and especially to ceramic constructional materials, and it is a continuation in part of an application Serial No. 258,699, filed by me on March 2, 1928.

It is among the objects of this invention to provide light weight ceramic articles having a highly vesicular or foam-like expanded structure which adapts them for use as heat or sound insulating materials, in the production of which the degree of expansion and size of the vesicles may be varied, which possess a bonded structure of substantial strength, may be easily and cheaply prepared from common ceramic raw materials and at temperatures below the vitrifying point, which are strong enough for many constructional purposes, and which satisfactorily receive and retain nails without breakage.

The invention is predicated upon my discovery that strong and light weight ceramic products having a highly cellular or foam-like structure may be obtained by vapor expansion of a ceramic mix with which there is incorporated a substance which at temperatures below the melting point of the mix is adapted to permit the formation and expansion by the vapor of vesicles distributed throughout the mix, and which is adapted to retain in the mass the vesicular structure thus produced. In the preferred embodiment this substance is also adapted to undergo thermal decomposition to bond the ceramic particles. Because of this bubble-retaining and particle-bonding action, the substances referred to are herein designated as binders. It is also preferred to generate the expanding or bubble-forming vapor in the mass itself, by means of a liquid contained in the mix.

A wide variety of body materials may be used, such as the commonly employed silicates, for example clays, talc, diatomaceous earth, kaolin, and others. Likewise there may be used silica, alumina, bauxite, shales, siderite, iron oxide, and the like. These materials are used either singly or in admixture with one another or with other ceramic materials in a finely ground condition, as is customary in ceramic practice. They form the base or body of the articles provided by the invention, and for brevity and comprehensiveness of terminology are referred to herein as "ceramic body materials."

The binders used in the practice of the invention are substances which may be readily and intimately incorporated with the ceramic body materials and which at the temperature of vapor formation used are plastic or viscous, so as to permit expansion of the vesicles formed by generation of vapor in the mix. In this condition such mixes will, in general, be of a fluent nature. That is, they will flow, but are too liquid to be pressed or extruded, and for the production of shapes should be handled in molds.

In general it is most desirable to use a binder which in addition to possessing the foregoing properties is also adapted to supply all, or a material proportion of, the liquid which is to be vaporized to produce the vesicular structure. Also, the preferred binders are substances which when heated sufficiently decompose to produce an insoluble solid which, being incorporated with the ceramic particles, affords a permanent bond.

Such materials are, for example, hydrous inorganic salts, such as sodium carbonate, calcium chloride, the sulfates of aluminum and magnesium, or the nitrates of calcium, zinc, aluminum or magnesium, reference being here made to the hydrated forms of all of these salts. These salts decompose at moderately low temperatures, liberating a gas and leaving a solid residue. These and other salts of a similar nature fuse in their own crystal water to form syrups. There may also be used salts which dissolve readily in water and which when suitably concentrated are syrupy. All of these materials may, for the purpose of this invention, be termed "hydrous."

There may also be used as binders colloidal organic materials, for example starch solutions, tar emulsions, or sugar solutions, such as molasses. These materials are also syrups in the broad sense of the word, and it may be said of any of the foregoing binding substances that they are combined with water, this being equally true of the hydrous salts and of the organic colloidal solutions.

In the production of articles in accordance with the invention, the ceramic body and binding materials are thoroughly mixed and, being reduced to a suitable fluent condition, are heated to convert the water to steam throughout the mass. According to one mode of operation, the binding material is heated to cause fusion in its crystal water and, while maintaining it in that condition, the ceramic body material is added with thorough mixing. The amount of binder may be chosen so as to provide a suitably fluent mix, in which condition the mass is preferably placed in a form of any desired shape for production of the foam-like structure. If desired, however, the solid binding and ceramic materials may first be mixed and then heated in a form to liquefy the binder and render the mass fluent, in which case heating may be, and preferably is, continued to convert the water into steam. In either case, additional water may be added to the binder, to the ceramic body material, or to the mix, to vary the results obtained, as will be described more fully hereinafter.

A suitable fluent mass having been prepared, it is then heated to produce the foam-like structure and to cause hardening. To this end, the mass, preferably contained in a form, is heated to convert into steam the water contained in the mix. This heating is preferably accomplished at a temperature materially below that of decomposition of the binder, but high enough to drive off both mechanically and chemically bound water.

The steam formation takes place throughout the mass, causing the formation of myriads of vesicles surrounded by envelopes of the mix, which latter forms a substantially continuous solid phase. Because the binder renders the mass plastic, the steam does not escape readily from the vesicles, which thereby expand, causing the entire mass to increase in bulk. Also, as the water in the mix is removed as steam, the binder tends to set, and the mix hardens, so that coalescence of the vesicles is largely prevented. In this manner, the foam-like structure thus produced is retained. The heating is continued until the mass has been dried and hardened sufficiently to permit handling.

Articles produced and hardened as just described may be used directly for some purposes, as for sound or heat insulation when properly supported. However, the body comprises ceramic particles bonded only by crystallized salts, or in the case of the organic binder, by dehydrated organic matter, no thermal or other ceramic bonding having been produced. For this reason, the material is not strong enough to withstand severe stressing.

Substantial strength may be obtained, however, by further hardening, without adversely affecting the desirable characteristics of the preliminarily hardened material. For this purpose the foam-like article produced as just described is fired at a temperature above the decomposition point of the binder. In the case of calcium nitrate, this causes the production of oxides of nitrogen, which escape from the mass, and a residue of calcium oxide remains. Prior to this firing step the envelopes of body material comprised particles of ceramic body material surrounded by or in intimate contact with the nitrate, so that upon firing, the oxide residue forms a refractory, insoluble, and substantially continuous binding phase in which the particles of ceramic material are distributed. The action of other binders of the types referred to will be apparent to those skilled in the art. Because the mass has been hardened prior to this step, the gas liberated in decomposition of the binder does not exert any material effect on the foam-like structure.

Although in general it is preferred to fire below a vitrifying temperature, it will be understood that chemical change between the binder and ceramic material may occur during the firing step. For example, using soda ash and silica or a silicate, some combination to form sodium silicate may occur. This will, of course, produce more highly bonded articles and, up to a certain point at least, will give a stronger product.

For the production of articles of general utility it is preferred to use clay, or clay and sand, with calcium nitrate or aluminum sulfate in the form of the ordinary commercial hydrated salts as binding agents. For example, 3 parts by weight of finely ground clay are mixed with 2 parts by weight of calcium nitrate $[Ca(NO_3)_2.4H_2O]$ previously liquefied by heating, and the mass is placed in a form and heated to about 200° C. on all sides except the top. This produces a highly vesicular structure which, after firing, at about 800° C. has a bulk density of about 0.4.

The color of the product may be varied depending upon the materials used. The clay product just described has a reddish color, and substantially white articles may be produced from kaolin and aluminum sulfate. In this case it is generally desirable to use a small amount of added water. A suitable mix is as follows:

| | Parts by weight |
|---|---|
| Ground kaolin | 1 |
| Aluminum sulfate | 2 |
| Water | 1 |

Upon heating this mix to fluidity, vesicle formation, swelling and hardening follow, and the article may be finally fired at about 900° C. Pigments and other coloring materials may be added to the mixes if desired.

The proportions of ceramic body material and binder vary according to the nature of the ceramic material, and according to the strength and degree of expansion desired, for which reasons no fixed proportions can be given. However, it may be said that a substantial amount of binder is used in all cases. In the case of clays, a ball clay will usually require more binder or salt syrup than an ordinary surface clay to produce the same product. Also, it in generally true for any given material that the larger the proportion of binder, the less the bulk gravity. That is, by increasing the proportion of salt, a more pronounced foam structure is produced. In cases where the proportion of salt or binder is decreased, water may be added to give an equal bulk, but in this case the products are usually of decreased porosity. It is also possible to use combinations of the the inorganic and organic binders. For example, in the foregoing example, one part of calcium nitrate may be replaced by one-tenth part of starch.

These relations are shown by the following tabulation of bulk gravities obtained by using finely ground Bedford shale, a finely ground ceramic grade of silica, and hydrated calcium nitrate. Mixes of varying proportions were made up as shown in the table, placed in forms, heated to about 150° C. and fired at about 800° C.

| Shale | $SiO_2$ | $H_2O$ | $Ca(NO_3)_2.4H_2O$ | Bulk grav. |
|---|---|---|---|---|
| Gm. | Gm. | Gm. | Gm. | |
| 240 | 560 | 100 | 200 | 1.0 |
| 195 | 455 | 80 | 350 | 0.75 |
| 155 | 465 | 60 | 380 | 0.61 |
| 130 | 400 | 20 | 470 | 0.45 |
| 150 | 350 | ------ | 500 | 0.4 |

In another series of tests, using surface clay, the results were as follows, the mixes being heated at about 150° C. and fired at about 800° C.

| Clay | $H_2O$ | $Ca(NO_3)_2.4H_2O$ | Bulk grav. |
|---|---|---|---|
| Gm. | Gm. | Gm. | |
| 670 | 200 | 330 | 0.66 |
| 700 | 230 | 300 | 0.8 |
| 500 | ------ | 500 | 0.3 |

The porosity or foam-like structure of these materials may also be increased by adding a supplementary vapor-forming material prior to heating. For example, where carbonates are used, a small amount of free acid added to the mix will cause liberation of carbon dioxide, adding to the bubble-producing effect of the steam. Or small amounts of carbonates and free acid may be added to non-carbonate mixes, and other materials may be used.

The products provided by the invention are especially adapted for constructional purposes. Being of a highly cellular nature, they are particularly suited as sound or heat insulators, and when fully hardened they possess sufficient resistance to crushing to permit their use in building partition walls, and for similar purposes. Nails may be driven easily into the hardened material without cracking or breaking, and the nails are firmly retained. Also, the products can be cut easily with a saw, clean, sharp cuts without material chipping being possible.

I claim:

1. A process of producing a ceramic article having a vesicular structure comprising mixing a ceramic body material with a substantial amount of a thermally-decomposable inorganic salt in syrup form, and heating the mass to produce by steam formation in the mass an expanded foam-like structure which is retained by hardening of the mass.

2. A process of producing a ceramic article having a vesicular structure comprising confining so as to permit expansion in one direction a fluent mix composed of a ceramic body material and a substantial amount of a thermally-decomposable inorganic salt in syrup form, and while thus confined heating the mass at a temperature below that of decomposition of said salt to produce by vapor expansion in the mass a foam-like structure, and continuing the heating to cause the mass to harden and retain said structure.

3. A process of producing a ceramic article having a vesicular structure comprising confining so as to permit expansion in one direction a fluent mix composed of a ceramic body material and a substantial amount of a thermally-decomposable inorganic salt in syrup form, and while thus confined heating the mass at a temperature above the boiling point of water and below about 300° C. to cause steam formation through the mass, whereby to expand the mass and produce a foam-like structure which is initially retained by said salt acting as a binder, and continuing the heating to harden the mass and fix said structure.

4. A process according to claim 2, said ceramic body material comprising clay, and said salt comprising hydrous calcium nitrate.

5. A process of producing a vesicular ceramic article comprising preparing a mix composed of a ceramic body material, a thermally-decomposable binder, and a liquid vaporizable below the decomposition temperature of said binder, and heating said mix to vaporize said liquid and produce throughout the mass an expanded foam-like structure in which the vesicles are initially retained by said binder, said structure being permanently fixed by subsequent hardening of the thus-expanded mass.

6. A process of producing a vesicular ceramic article comprising preparing a mix composed of a ceramic body material and a hydrous thermally-decomposable binder, and heating said mix to vaporize the water of said binder and produce throughout the mass an expanded foam-like structure in which the vesicles are initially retained by said binder, said structure being permanently fixed by subsequent hardening of the thus-expanded mass.

7. A process of producing a ceramic article having a vesicular structure comprising mixing a ceramic body material with a substantial amount of readily fusible hydrous inorganic salt which is decomposable by heat to produce a gas and an insoluble solid, heating the mixture at a temperature below that of decomposition of the salt to produce steam throughout the mass and form an expanded foam-like structure, and firing the thus vesiculated mass to decompose said salt, the solid formed by decomposition of said salt bonding said ceramic material.

8. A process of producing a ceramic article having a vesicular structure comprising mixing a natural silicate and a substantial amount of a thermally-decomposable inorganic salt in syrup form capable on heating of producing an insoluble solid and a gas, heating the mix at a temperature below that of decomposition of the salt to cause formation of steam throughout the mass and produce an expanded foam-like structure, continuing the heating to cause the mass to harden and retain said structure, and subsequently firing the mass to decompose said salt and thereby form an insoluble bonding material distributed throughout the ceramic material envelopes.

9. A process of producing a vesicular ceramic article according to claim 8, said silicate comprising a clay, and said salt comprising a hydrous metallic nitrate.

10. A process of producing a vesicular ceramic article according to claim 8, said silicate comprising a clay, and said salt comprising hydrated aluminum sulfate.

11. A process of producing a ceramic article having a vesicular structure comprising preparing a mix containing a ceramic body material and a vesicle-retaining binder, producing an expanded foam-like structure by expanding a vapor in the mix while in a plastic condition, and subsequently firing the thus expanded mass.

12. As a new article of manufacture, a fired light weight ceramic article comprising a body of ceramic material having a foam-like structure comprising expanded vesicles surrounded by envelopes of said material bonded by a thermal decomposition product.

13. As a new article of manufacture, a foam-like ceramic article composed of a fired ceramic body material bonded by a metallic oxide formed in the mass by thermal decomposition of an inorganic salt, and having vapor-expanded vesicles distributed throughout the mass.

14. As a new article of manufacture, a fired light weight foam-like clay body having vapor-expanded vesicles distributed throughout, said clay being bonded by calcium oxide formed in the mass by thermal decomposition of a calcium salt.

In testimony whereof, I sign my name.

ROBERT K. McBERTY.